Figure 1:
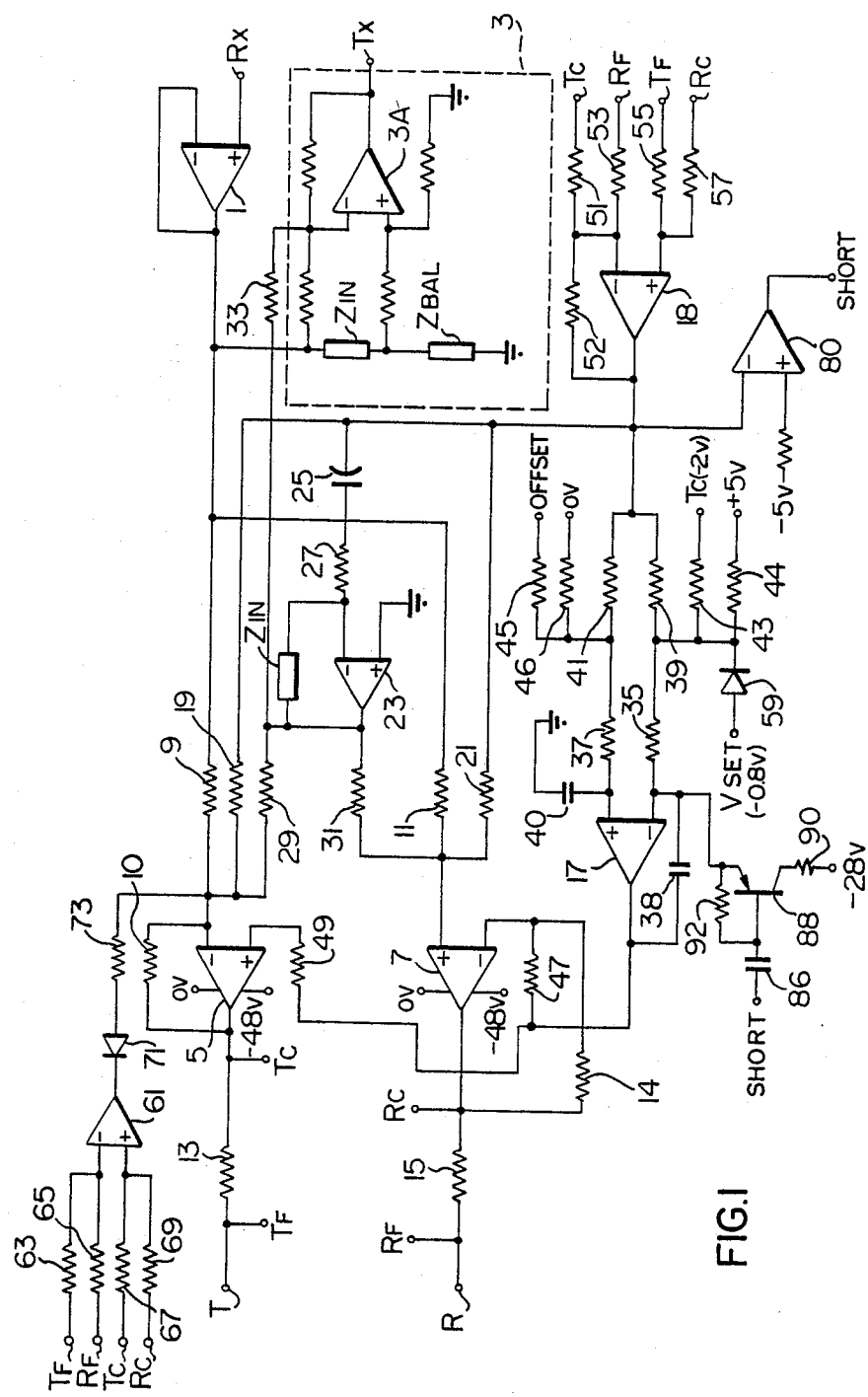

United States Patent [19]

Schingh

[11] Patent Number: 4,803,721
[45] Date of Patent: Feb. 7, 1989

[54] DC CONTROL CIRCUIT
[75] Inventor: Pierre J. Schingh, Gatineau, Canada
[73] Assignee: Mitel Corp., Kanata, Canada
[21] Appl. No.: 127,902
[22] Filed: Dec. 2, 1987
[30] Foreign Application Priority Data Dec. 24, 1986 [CA] Canada .................................. 526334

[51] Int. Cl.[4] ............................................. H04M 9/00
[52] U.S. Cl. ..................................... 379/399; 379/413
[58] Field of Search ............... 379/399, 400, 401, 412, 379/413, 345, 324

[56] References Cited
U.S. PATENT DOCUMENTS 4,563,547  1/1986  Booth ............................... 379/236 X
4,604,741  8/1986  Barsellotti ....................... 379/400 X
4,723,280  2/1988  Meier et al. ......................... 379/413

Primary Examiner—James L. Dwyer
Attorney, Agent, or Firm—Antonelli, Terry & Wands

[57] ABSTRACT

A DC control circuit for limiting metallic and longitudinal currents flowing in a balanced telephone line, and maintaining a predetermined DC bias voltage on tip and ring leads of the balanced line. A negative feedback path is established for monitoring voltage on the tip lead, comparing the monitored voltage with a predetermined offset bias voltage and generating a DC signal for application to tip and ring driver circuits for application to the balanced line in response thereto. Longitudinal and metallic currents are detected in a further pair of differential amplifiers for generating further DC signals such that a voltage corresponding to the detected longitudinal current is generated and applied to the tip lead, whereby a first one of the further pair of differential amplifiers adjusts the generated DC bias signal for limiting the longitudinal current flowing in the tip and ring leads. The detected metallic current is compared with a predetermined threshold signal, and in the event the detected current is greater than the threshold signal, the second differential amplifier reduces the voltage difference between the tip and ring leads, thereby reducing the metallic current flowing therethrough.

10 Claims, 1 Drawing Sheet

DC CONTROL CIRCUIT

This invention relates in general to telephone line circuits, and more particularly to a DC control circuit for maintaining a predetermined DC bias voltage level on a balanced telephone line, and limiting longitudinal and metallic currents flowing therethrough.

Private Automatic Branch Exchanges (PABXs) normally supply operating power to a balanced telephone line at typically −48 volts DC, applied across tip and ring leads of the line. Solid state line circuits associated with the PABX apply AC signals differentially to the tip and ring leads via associated tip and ring differential driver circuits.

It is desirable that the DC voltage appearing on the tip and ring leads be maintained at a predetermined bias voltage level, for example 2 volts, from the nominal line voltage in order to ensure that AC signal amplitudes do not exceed the nominal line voltages, which would result in distortion of the audio signal, known as clipping. For example, with a 2 volt offset level, the tip lead is maintained at a voltage of approximately −2 volts DC while the ring lead is maintained at a voltage of approximately −46 volts DC, thereby providing a 2 volt range within which the AC signal amplitude may vary without causing distortion due to clipping.

A further desirable characteristic of modern day line interface circuits is the provision of circuitry for limiting the longitudinal current in the event one of the tip or ring leads is grounded. This can occur, for example, as a result of an Earth Recall Button being depressed at a remote subscriber set, causing the ring lead to be grounded.

Furthermore, limiting of metallic current is desirable in the event of short subscriber loops. Metallic current has been defined in the field of telecommunications, as being the total actual direct current drawn from the DC battery return circuit, through the tip lead and any circuitry connected to the tip and ring leads (e.g. a remote subscriber set, trunk circuit, etc.,), and returning through the ring lead to the −48 volt battery feed circuit.

Longitudinal current has been defined in the telecommunication arts as being the current which flows from ground to one of either the tip or ring leads. Accordingly, the longitudinal current is the difference in actual DC currents flowing in the tip lead and the ring lead.

One prior art line circuit which includes current limiting is described in Canadian Pat. No. 1,157,175 granted to Mitel Corporation and issued on Nov. 15th, 1983. In operation, the prior art Mitel circuit detects current drawn from a high voltage power source by a subscriber's line above a predetermined threshold and connects a lower voltage power supply source to the line in response thereto, thereby reducing the current drawn by the line. In the event the detected current drawn by the line drops below a second lower threshold, the high voltage power source is reconnected.

Because the Mitel device switches between two discrete power supply voltages, power supplied to the line is substantially wasted in the event of a short line loop length which is not sufficiently short to draw current above the first predetermined threshold.

A further prior art line circuit employing current limiting is described in applicant's copending Canadian patent Serial No. 476,683, filed Mar. 15th, 1985. According to this further prior art circuit, negative feedback is provided for ensuring a constant current line feed. However, no AC offset level is provided, such that in the event of a long loop length the power rail voltage is reached due to the constant current feed, and AC signals are not transmitted. In addition, detection of depression of an Earth Recall button is provided in applicant's prior art line circuit in a rudimentary fashion, employing a simple comparator which causes the line current to be limited or fixed at a predetermined value in the event of depression of the Earth Recall button.

Older prior art line circuits used transformer hybrids for translating AC signals between a telephone line and switching system such as a PABX, as well as providing line feed current to the telephone line. Because these hybrids used transformer AC signal coupling instead of direct drive solid state differential amplifiers etc., no DC biasing was required. However, the transformer hybrids were found to be very bulky and expensive and have now generally been superceded in present day systems by solid state direct drive circuitry.

Another prior art attempt at overcoming the problems of DC biasing and current limiting has been to utilize independent current regulators, such as switching regulators, associated with one or both of the tip and ring leads. However, it has been found that such independent regulators typically contribute to unwanted circuit complexity, size and cost.

According to the present invention, a DC control circuit is provided in a telephone line circuit, wherein a negative feedback path is established between the tip lead and a differential amplifier, for comparing the monitored tip lead voltage with a predetermined offset voltage and generating a DC bias signal proportional to the difference therebetween. The bias signal is applied equally to the tip and ring differential driver circuits. Hence, the voltages on the tip and ring leads are maintained at a predetermined bias level offset from the nominal line voltages, for accommodating AC signal amplitude variations, and thereby preventing distortion due to signal clipping.

A second differential amplifier is provided for monitoring the metallic current flowing in the tip and ring leads, and generating a further DC signal inversely proportional thereto.

The aforementioned further DC signal is compared with a predetermined threshold signal via the first differential amplifier such that in the event the metallic current reaches a predetermined level, as set by the aforementioned predetermined threshold signal, the DC bias signal is adjusted to limit the metallic current to the predetermined level. Accordingly, the line circuit becomes a constant current source once the metallic current reaches the aforementioned predetermined level.

A further differential amplifier is provided for monitoring the longitudinal current flowing in the tip and ring leads and generating a DC correction signal for application to the tip lead.

The first differential amplifier monitors the voltage on the tip lead as described above, and compensates for the detected additional voltage appearing on the tip lead due to the correction signal. Hence, the DC bias signal is further adjusted such that the voltage on the tip lead is maintained at the aforementioned bias level offset from the nominal line voltage while the voltage on the ring lead is adjusted toward ground potential thereby limiting the longitudinal current to a predetermined level.

Thus, the DC control circuit according to the present invention, provides correct biasing of the DC voltage on the tip and ring leads while simultaneously limiting the metallic and longitudinal currents flowing therein to a constant level.

The circuit is straightforward and inexpensive, and may be advantageously fabricated into an integrated circuit chip.

A better understanding of the present invention will be obtained with reference to the detailed description below in conjunction with the following drawing, in which:

FIG. 1 is a schematic diagram of a line circuit including a DC control circuit according to the present invention.

With reference to FIG. 1, receive and transmit circuits 1 and 3 are illustrated for receiving and transmitting audio signals to and from a communication system, such as a PABX, via $R_x$ and $T_x$ terminals thereof, respectively. The received signals are differentially applied to tip and ring terminals T and R, connected to a balanced telephone line via respective tip and ring differential driver circuits 5 and 7, respectively.

In particular, a signal received on the $R_x$ terminal is amplified via receive circuit 1, shown diagrammatically as a differential amplifier, and applied via equal valued resistors 9 and 11 to inverting and non-inverting inputs of driver circuits 5 and 7 respectively. The received signals are then differentially applied to the tip and ring terminals T and R, via equal valued output resistors 13 and 15, respectively.

Signals from a remote circuit, such as a subscriber set or trunk circuit, carried by the balanced line and appearing on the tip and ring terminals, T and R, are received and amplified via a further differential amplifier 18, and applied to an additional amplifier 23 via AC coupling capacitor 25 and input resistor 27. The received signals are amplified in amplifier 23, and applied to the transmit circuit 3 for reception by the PABX, via the $T_x$ terminal. Amplifier 23 has an AC input matching impedance $Z_{IN}$ connected thereto, for generating a nominal AC input impedance in a well known manner.

The transmit circuit 3 is shown diagrammatically as being comprised of a differential amplifier 3A, line balancing impedances $Z_{IN}$ and $Z_{BAL}$, as well as various gain adjusting resistors, all of which comprises a well known design.

A portion of the amplified signal from amplifier 18 is reapplied in aiding phase (i.e. via positive feedback), to the tip and ring leads via driver circuits 5 and 7, through equal valued resistors 19 and 21 respectively. The positive feedback of the received signals to the tip and ring leads serves to cancel the effect of output resistors 13 and 15 on the input impedance established by $Z_{IN}$. Resistors 13 and 15 and $Z_{IN}$, equal to the nominal balanced line impedance, yet resistors 13 and 15 can be made of low resistance for providing a low resistance line current feed.

The signals output from amplifier 18 are also applied to inverting and non-inverting inputs of an amplifier 17 via equal valued resistors 35 and 37, and equal valued resistors 39 and 41, and are thus effectively cancelled.

A certain amount of AC and DC feedback is provided by feedback resistors 10 and 14 connected to driver circuits 5 and 7 respectively.

Considering the DC control aspect of the present invention, a −48 volt DC battery voltage source is applied to the balanced line via driver circuits 5 and 7.

Amplifier 17 functions as a DC controller or integrator for monitoring the DC voltage appearing on the tip lead at the terminal $T_c$, via resistor 43, and comparing the monitored tip lead voltage with a predetermined DC voltage denoted as OFFSET, via resistor 45.

Capacitor 38 is connected to the output and inverting input of amplifier 17, and capacitor 40 is connected to the non-inverting input and ground, for filtering out AC signals, such as audio, and thereby facilitate DC current control.

Amplifier 17 generates a DC bias level signal proportional to the difference in voltage between the monitored line voltage at $T_c$ and the external OFFSET voltage. The DC bias signal is applied equally to inverting and non-inverting inputs of ring and tip driver circuits 7 and 5 via equal valued resistors 47 and 49, respectively, such that a negative feedback path is established for maintaining the DC voltages on the tip and ring leads at the predetermined bias level (controlled by the OFFSET signal), relative to the nominal line voltages of 0 volts DC and −48 volts DC, respectively.

For example, disregarding the effect of amplifier 18 which introduces a common mode signal to amplifier 17, in the event the OFFSET voltage is set at zero volts, the voltage at the node connecting resistors 37, 41, 45 and 46 is forced to zero volts. Due to negative feedback of the voltage appearing on the tip at the $T_c$ terminal, i.e. −2 volts, the voltage at the node connecting resistors 35, 39, 43 and 44 is also forced to zero volts. In other words, the current flowing from the +5 volt source through resistors 44 and 43 towards the −2 volt sink provided by the $T_c$ terminal, results in ground potential appearing at the node connecting resistors 35, 39, 43 and 44.

Accordingly, the negative feedback path established by amplifier 17 provides DC signal biasing for maintaining the DC line voltage levels on the tip and ring leads at −2 volt DC and −46 volt DC, respectively, in the manner of a constant voltage source.

In the event of excess current being drawn by the tip and ring leads, due to a short line loop length, etc., current limiting is provided for reducing the total metallic current drawn by the tip and ring leads to a predetermined level.

In particular, amplifier 18 has inverting and non-inverting inputs connected across line feed resistors 13 and 15 at terminals $T_c$, $T_f$, $R_c$ and $R_f$ via equal valued input resistors 51, 53, 55 and 57. A feedback resistor 52 is connected from an output of amplifier 18 to an inverting input thereof, in a well known manner. Amplifier 18 senses the metallic current drawn in the tip and ring leads by summing the currents flowing through line feed resistors 13 and 15, rejecting common mode currents, and in response generating a further DC output voltage signal inversely proportional thereto.

A predetermined DC threshold voltage VSET (e.g. −0.8 volts), is applied to the inverting input of amplifier 17 via a diode 59 and input resistor 35 such that in the event the voltage output from amplifier 18 is sufficient to maintain the voltage on the node connecting resistors 37 and 41, and 35 and 39 at approximately 0 volts, diode 59 remains reversed-biased, and the further DC voltage is applied equally to the inverting and non-inverting inputs of amplifier 17 via resistors 41 and 37, 39 and 35, so as to be effectively cancelled.

However, in the event that the metallic current increases beyond a predetermined threshold, such that the voltage at the node connecting resistors 35 and 39 drops below a predetermined voltage (denoted as X), equal to the sum of $V_{SET}$ minus the forward voltage drop across diode 59, the inverting input of amplifier 17 is maintained at approximately X volts, and the voltage output from amplifier 18 is applied only to the non-inverting input of amplifier 17, so as to be differentially received and amplified therein.

Accordingly, amplifier 17 ceases monitoring only the tip voltage carried by the terminal $T_c$, and the DC bias signal output from amplifier 17 is adjusted in relation to the detected metallic current, for limiting the metallic current drawn by the tip and ring leads to a predetermined level (e.g. 30 millamps) as set by the threshold voltage $V_{SET}$. In particular, the DC bias voltage is adjusted such that the voltage difference between the line voltages on the tip and ring leads is reduced, thereby maintaining the metallic current at the aforementioned predetermined level (e.g. 30 millamps).

Thus, when drawing nominal current, the control circuit of the present invention provides negative feedback of the line voltage carried by the $T_c$ terminal, for maintaining the voltages on the tip and ring leads at predetermined offset bias voltages from their nominal levels. Upon detection of a metallic current in excess of a predetermined threshold level established by $V_{SET}$, diode 59 turns on, effectively clamping the voltage on the inverting input of amplifier 17 at X volts, such that the DC bias signal output therefrom is adjusted in response to the metallic current detected via amplifier 18, thereby maintaining the current at a predetermined level.

According to a successful prototype of the invention resistors 43 and 46 were each 200 k ohms, resistors 41 and 39 were each 42 k ohms, resistors 37 and 35 were each 150 k ohms, and resistors 44 and 45 were each 500 k ohms.

In addition to controlling the DC biasing aspect and metallic current limiting aspects of the line circuit, amplifier 17 is utilized further to limit longitudinal currents flowing in the tip and ring leads.

An additional differential amplifier 61 is provided for monitoring the longitudinal current flowing between the tip and ring leads by monitoring the voltages across feed resistors 13 and 15 via the $T_c$, $T_f$, and $R_c$ terminals and equal valued input resistors 63, 65, 67 and 69. An output of amplifier 61 is connected via diode 71 to an EGB control terminal connected to the inverting input of amplifier 5 via a resistor 73. Longitudinal currents flowing through resistors 13 and 15 are detected in amplifier 61 while metallic currents are rejected, and a DC control signal denoted as EGB CONTROL, is generated by amplifier 61 proportional to the detected longitudinal currents.

The EGB CONTROL signal is applied to the tip lead via the inverting input of driver circuit 5, but is not applied to the ring lead. Accordingly, the DC control amplifier 17 adjusts the DC bias signal for maintaining the voltage on the tip lead at the aforementioned predetermined offset level while the voltage on the ring lead is caused to increase toward zero volts by an amount proportional to the detected longitudinal current. Thus, longitudinal current limiting is provided in the event the ring lead is connected to ground, such as for example in the event of depression of an Earth Recall button associated with a remote subscriber set, etc.

According to a successful prototype, the EGB differential amplifier 61 was linear and the negative feedback path from the $T_c$ terminal through amplifier 17 resulted in the longitudinal current being limited to approximately 11 millamps.

Depression of the remote Earth Recall button (which grounds one of either the ring lead or tip lead) can be detected by monitoring the EGB CONTROL signal voltage from an external device, such as a microprocessor, and excessively high longitudinal currents are simultaneously prevented.

Since the aforementioned DC biasing is differentially controlled, the circuit according to the present invention can be utilized to sense whether ground has been applied to either the tip or ring lead regardless of line length, because introduction of the EGB CONTROL signal via amplifier 61 results in constant longitudinal current regardless of the loop length, assuming that the resistance of the remote circuit (e.g. subscriber set) is small in relation to the resistance resulting from the loop length.

A comparator 80 and an inverting input connected to the output of differential amplifier 18 and a non-inverting input connected to a source of threshold voltage (i.e. $-5$ volts). As discussed above, differential amplifier 18 detects the flow of metallic current in the tip and ring leads. The signal output from amplifier 18 is monitored in comparator 80 and compared with the threshold voltage for detecting changes in line impedance of the tip and ring leads.

Thus, in the event of a sudden impedance change in a remote load (i.e. a central office trunk circuit) connected to the tip and ring leads (for example, as a result of the trunk circuit switching from a battery ground feed to a loop feed), decreased metallic current flows in the telephone line. The decreased metallic current flow is detected in differential amplifier 18, causing the comparator 80 to generate a control signal designated as SHORT.

The SHORT signal output from comparator 80 is applied via a differentiating capacitor 86 to the base input of a PNP transistor 88 having a collector terminal thereof connected via pull up resistor 90 to a source of $-28$ volts DC, and an emitter terminal connected to the base terminal via resistor 92 and to one terminal, the aforementioned integrating capacitor 38 connected between the output of amplifier 17 and the inverting input thereof.

In the event of sudden changes in the flow of metallic current as a result of sudden impedance changes in the tip and ring lead (due, for example, to the remote trunk circuit switching from a battery ground to loop feed, as discussed above), the change in the output signal from comparator 80 is differentiated via differentiating capacitor 86 causing a momentary enabling pulse to be applied to the base of PNP transistor 88. In response, transistor 88 is momentarily enabled, thereby discharging integrating capacitor 38 via the source of discharging potential $-28$ volts DC through resistor 90.

Thus, amplifier 17 quickly compensates for the change in line impedance, whereas in prior art systems the line circuit would have operated in a reduced current mode due to settling time of integrating capacitor 38.

In summary, according to the present invention, a DC control circuit is provided utilizing negative feedback for providing DC biasing of voltages appearing on the tip and ring leads and simultaneous current limiting of both metallic and longitudinal currents. It is an important aspect of the present invention that various components thereof perform multiple functions, resulting in significant economy in quantity of components. For instance, DC control amplifier 17 provides the aforementioned DC biasing as well as functioning in conjunction with amplifiers 18 and 61 to effect the aforementioned metallic current limiting and longitudinal current limiting. Also, amplifier 18 as well as driver circuits 5 and 7 perform important AC signal transmission functions which are not part of the present invention, but are essential to operation of a line interface circuit.

A person understanding the present invention may conceive of further embodiments thereof. All such embodiments and modifications are believed to be within the sphere and scope of the present invention as defined in the claims appended hereto.

I claim:

1. In a telephone interface circuit including tip and ring lead differential driver circuits connected via respective output resistors to tip and ring terminals for carrying nominal DC line voltages, the improvement comprising a DC control circuit comprised of means for comparing the DC voltage carried by said tip terminal with a predetermined DC offset voltage, and in response generating and applying a DC bias signal to each of said tip and ring terminals via respective ones of said driver circuits, such that the DC voltages carried by said tip and ring terminals are maintained at respective predetermined levels offset from said nominal voltages by an amount equivalent to said predetermined DC offset voltage.

2. A DC control circuit as defined in claim 1, including metallic current limiting means for monitoring the metallic current flowing in said output resistors and adjusting said DC bias signal in the event said current exceeds a predetermined threshold level, such that the difference between said DC voltages carried by the tip and ring terminals is reduced by an amount sufficient for maintaining said metallic current at said predetermined threshold level.

3. A DC control circuit as defined in claim 2, including longitudinal current limiting means for monitoring the longitudinal current flowing in said output resistors and generating and applying a DC correction voltage to said tip lead, such that said means for comparing adjusts the DC bias signal applied to each of said tip and ring terminals for maintaining the DC voltage carried by said tip lead at said predetermined level offset from the nominal tip lead voltage, and reducing the DC voltage carried by said ring lead by an amount equivalent to said DC correction voltage.

4. A DC control circuit as defined in claim 1, wherein said means for comparing is comprised of a high gain differential amplifier having an inverting input thereof connected in a circuit to said tip lead, a non-inverting input thereof connected to a source of said predetermined DC offset voltage, and an output thereof connected in a circuit to an inverting input of the ring lead differential driver circuit and a non-inverting input of the tip lead differential driver circuit.

5. A DC control circuit as defined in claim 2, wherein said means for comparing is comprised of a first differential amplifier having an inverting input thereof connected in a circuit to said tip lead and to a voltage source for establishing said predetermined threshold level, a non-inverting input thereof connected to a source of said predetermined DC offset voltage, and an output thereof connected in a circuit to an inverting input of the ring lead differential driver circuit and a non-inverting input of the tip lead driver circuit, and said metallic current limiting means is comprised of a second differential amplifier having inverting and non-inverting inputs thereof connected across said output resistors according to a predetermined configuration such that said second differential amplifier generates an output voltage inversely proportional to the sum of the voltages appearing across said output resistors, an output of said second differential amplifier being connected in a circuit to the inverting and non-inverting inputs of the first differential amplifier.

6. A DC control circuit as defined in claim 3, wherein said longitudinal current limiting means is comprised of a third differential amplifier having inverting and non-inverting inputs thereof connected across said output resistors according to a predetermined configuration such that said third differential amplifier generates an output voltage proportional to the difference of the voltages appearing across respective ones of said output resistors, and wherein an output of said third differential amplifier is connected to an input of the tip lead differential driver circuit.

7. A DC control circuit as defined in claim 2, wherein said means for comparing is comprised of a high gain differential amplifier having an inverting input thereof connected in a circuit to said tip lead, a non-inverting input thereof connected to a source of said predetermined DC offset voltage, and an output thereof connected in a circuit to an inverting input of the ring lead differential driver circuit and a non-inverting input of the tip lead differential driver circuit.

8. A DC control circuit as defined in claim 3, wherein said means for comparing is comprised of a high gain differential amplifier having an inverting input thereof connected in a circuit to said tip lead, a non-inverting input thereof connected to a source of said predetermined DC offset voltage, and an output thereof connected in a circuit to an inverting input of the ring lead differential driver circuit and a non-inverting input of the tip lead differential driver circuit.

9. In a telephone interface circuit including tip and ring differential driver circuits connected to tip and ring leads of a balanced telephone line, a DC control circuit comprised of:

(a) first differential amplifier means having a first input thereof connected in a circuit to said tip lead and to a source of predetermined threshold voltage via a diode, a second input thereof connected in a circuit to a source of offset voltage, and an output thereof connected to opposite inputs of the differential driver circuits via respective circuit paths, for monitoring the voltage on the tip lead and generating a DC bias voltage for maintaining the voltage on said tip and ring leads at predetermined line voltage levels in response thereto, (b) second differential amplifier means having a pair of inputs connected via respective circuit paths to said tip and ring leads, and an output connected to said inputs of the first differential amplifier means via further respective circuit paths, for generating an output voltage inversely proportional to the metallic current flowing in said tip and ring leads, whereby said first differential amplifier means limits the DC bias voltage in the event said output voltage is less than said threshold voltage, thereby limiting the metallic current flowing through said tip and ring leads, and (c) third differential amplifier means having a pair of inputs connected via respective circuit paths to said tip and ring leads, and an output connected via a further circuit path to an inverting input of the tip lead differential driver circuit, for generating a further output voltage proportional to the longitudinal current flowing in said tip and ring leads, whereby said first differential amplifier means generates an adjusted DC bias voltage for maintaining the voltage on the tip lead at said predetermined line voltage level and reducing the voltage on the ring lead in proportion to the further output voltage proportional to the longitudinal current, thereby limiting the longitudinal current flowing in said tip and ring leads.

10. In a telephone interface circuit including tip and ring lead differential driver circuits connected via respective output resistors to tip and ring terminals for carrying nominal DC line voltages, a method of DC battery control comprising the steps of comparing the DC voltage carried by said tip terminal with a predetermined DC offset voltage and in response generating and applying a DC bias signal to each of said tip and ring terminals via respective ones of said driver circuits, such that the DC voltages carried by said tip and ring terminals are maintained at respective predetermined levels offset from said nominal voltages by an amount equivalent to said predetermined DC offset voltage.

* * * * *